United States Patent [19]

Lu

[11] 4,379,912

[45] Apr. 12, 1983

[54] METHOD OF MAKING POLYESTER PREPOLYMERS

[75] Inventor: Chen-i Lu, Webster, N.Y.

[73] Assignee: Eastman Kodak Company, Rochester, N.Y.

[21] Appl. No.: 407,401

[22] Filed: Aug. 12, 1982

[51] Int. Cl.³ .............................................. C08G 63/22
[52] U.S. Cl. .................................. 528/274; 528/272; 528/480; 528/495; 528/499
[58] Field of Search ............... 528/274, 272, 480, 495, 528/499

[56] References Cited

U.S. PATENT DOCUMENTS

| | | | |
|---|---|---|---|
| T887,005 | 6/1971 | Kibler et al. | 260/75 |
| 3,014,011 | 12/1961 | Zoetbrood | 260/75 |
| 3,075,952 | 1/1963 | Coover et al. | 260/75 |
| 3,342,782 | 9/1967 | Barkey | 260/75 |
| 3,390,134 | 6/1968 | Kibler | 260/75 |
| 3,544,525 | 12/1970 | Balint et al. | 260/75 |
| 4,230,818 | 10/1980 | Broughton et al. | 528/272 |
| 4,289,874 | 9/1981 | Bockrath | 528/487 |

*Primary Examiner*—Lucille M. Phynes
*Attorney, Agent, or Firm*—David F. Janci

[57] ABSTRACT

A polyester prepolymer having increased reactivity when subjected to molecular weight buildup, such as in solid phase polymerization is prepared by an improved method which includes the steps of: reacting a dicarboxylic acid and a glycol in the presence of a transesterification catalyst to form a reaction mixture containing condensation oligomers; purifying the reaction mixture to remove substantially all of the reaction by-products and residual dicarboxylic acid, glycol and catalyst and to crystallize the condensation oligomers; and polycondensing the oligomers to form a molten prepolymer.

19 Claims, 2 Drawing Figures

METHOD OF MAKING POLYESTER PREPOLYMERS

FIELD OF THE INVENTION

This invention relates to an improved method of preparing polyester prepolymers. In particular, this invention provides a method of preparing polyester prepolymers, composed of constituents of dicarboxylic acids and glycols and melting above about 40° C., which prepolymers have an increased rate of reactivity when they are subjected to polymerization. This invention also pertains to an improved method for preparing polyesters.

BACKGROUND OF THE INVENTION

In the preparation of polymers known in the art as polyesters, one or more dicarboxylic acids and one or more glycols (or functional equivalents thereof) are reacted in the presence of a transesterification catalyst to form a relatively low molecular weight polymer, often referred to as an "oligomer", which has an average degree of polymerization of about 4 or less. Such an oligomer is conventionally prepared by an ester exchange reaction which comprises condensing a lower dialkyl ester of a dicarboxylic acid(s) with a stoichiometric excess of a glycol(s) until most of the dialkyl ester has been converted to glycol esters and oligomers.

Further heating of the oligomers under conditions facilitating removal of glycol and, optionally, in the presence of polycondensation catalysts then leads to a gradual increase in molecular weight as the oligomers polymerize by reacting with one another. At intermediate stages, such as at a molecular weight in the range of from about 2000 to about 10,000, the polymer is often termed a "prepolymer" and is in the molten state. It has been customary for those skilled in the polymer chemistry art to polymerize the prepolymer until the molecular weight of the polymer has attained a prescribed useful value such as about 40,000. Ordinarily, this value is expressed as an inherent viscosity. For example, it is known in the art that the final inherent viscosity of one useful polyester, poly(ethylene terephthalate), must be higher than about 0.5 in order for that polyester to have advantageous physical properties when extruded as a film.

It is also known that most polyesters, including poly(ethylene terephthalate), undergo thermal degradation when held above their melting temperatures for extended periods of time. Such degradation increases as the temperature is increased. Further, in the presence of oxygen, oxidation occurs which is also accelerated by higher temperatures. Although the polymerization reaction rate generally increases with temperature, the time necessary to produce a prepolymer of sufficient molecular weight for commercial use is such that undesired colored products have often resulted, seriously affecting some uses of the eventual polymer. Changing the catalyst or adding a color stabilizer has been suggested as a way for improving the polymer color. However, such attempts to control color have had limited success.

It is further known that polyesters can be prepared by a continuous melt polymerization process wherein the molecular weight build-up of the prepolymer is continued as an extension of the molten polycondensation of the prepolymer. It is also known that solid phase (i.e. powder) polymerization techniques can be utilized to obviate certain defects of the melt polymerization process, such as the unsatisfactory color of the polymer produced by high melt polymerization temperatures. Since solid phase polymerization is carried out at temperatures below the melting point of the prepolymer, thermal degradation and the resulting discoloration are greatly reduced. The main defect in the solid phase polymerization process is the relatively long reaction time necessitated by the technique.

As pointed out in U.S. Pat. No. 3,342,782 (issued Sept. 19, 1967 to Barkey), the long reaction time for the solid phase polymerization is believed to be due to the relatively low reactivity of the prepolymer produced by the melt polymerization process. In the Barkey patent, a method for improving the reactivity of the prepolymer is described whereby the prepolymer is crystallized by casting it upon an inert surface and cooling it in a carefully controlled way prior to solid phase polymerization. Although this method is effective in improving prepolymer reactivity, it has several disadvantages. Namely, it is a relatively slow technique for crystallizing the prepolymer and requires an undesirable interruption between polycondensation and solid phase polymerization. Further, it is limited to solid phase polymerization and is not adaptable to other methods of polymerization, such as melt phase polymerization.

Disclosures of typical polyester preparation methods are provided, for example, in U.S. Pat. Nos. 3,075,952 (issued Jan. 29, 1963 to Coover, Jr. et al.) and 3,390,134 (issued June 25, 1968 to Kibler). As described therein, conventional polyester preparation includes a crystallization step directly after melt phase polycondensation wherein solid particles of the prepolymer are treated with a volatile organic liquid to increase prepolymer crystallinity. Solid phase polymerization then follows. This crystallization technique, however, does nothing to improve prepolymer reactivity. Furthermore, it is similar to the process of U.S. Pat. No. 3,342,782 in that it is limited to solid phase polymerization and not adaptable to other polymerization methods.

Hence, there is still a need in the art for a method of improving polyester prepolymer reactivity, thereby shortening polymerization time and reducing the likelihood of undesirable polyester properties, e.g. discoloration. Furthermore, it is desired that such a method would provide a more reactive prepolymer which can be polymerized in any suitable polymerization process.

SUMMARY OF THE INVENTION

This invention provides a novel method of making polyester prepolymers whereby the problems encountered with known methods are overcome. Specifically, the prepolymers prepared by the method of this invention have increased reactivity when subjected to any suitable polymerization technique, including molten and solid phase polymerization techniques. The polymers prepared from such prepolymers are characterized by minimum discoloration because the time they are subjected to high polymerization temperatures is minimized.

In practicing the method of this invention, a dicarboxylic acid and a glycol, or functional equivalents thereof, are reacted together in the presence of a transesterification catalyst. This reaction is carried out at a reaction temperature and pressure effective to form a reaction mixture containing condensation oligomers, reaction by-products and residual dicarboxylic acid, glycol and catalyst. Such reaction mixture is subjected to a temperature and pressure effective to polycondense substantially all of the oligomers to form a molten prepolymer and, thereafter, the molten prepolymer is further polymerized, either in the molten state or after solidification.

The characterizing feature of this method, which enables it to provide the advantageous results described hereinabove, is a purification step carried out between the reaction step which provides the reaction mixture and the polycondensation step. During this purification, substantially all of the reaction by-products and residual dicarboxylic acid, glycol and catalyst are removed and the condensation oligomers are crystallized.

This invention also provides a novel method for preparing polyesters. In practicing this method, a dicarboxylic acid and a glycol, or functional equivalents thereof, are reacted together in the presence of a transesterification catalyst. This reaction is carried out at a reaction temperature and pressure effective to form a reaction mixture containing condensation oligomers, reaction by-products and residual dicarboxylic acid, glycol and catalyst. Such reaction mixture is subjected to a temperature and pressure, in one or more stages, to polymerize substantially all of the oligomers to form a polyester. The characterizing feature of this method is a purification step, as described hereinabove, carried out immediately after the reaction step to remove substantially all of the reaction by-products and residual dicarboxylic acid, glycol and catalyst and to crystallize the condensation oligomers.

DETAILED DESCRIPTION OF THE INVENTION

Figure 1:
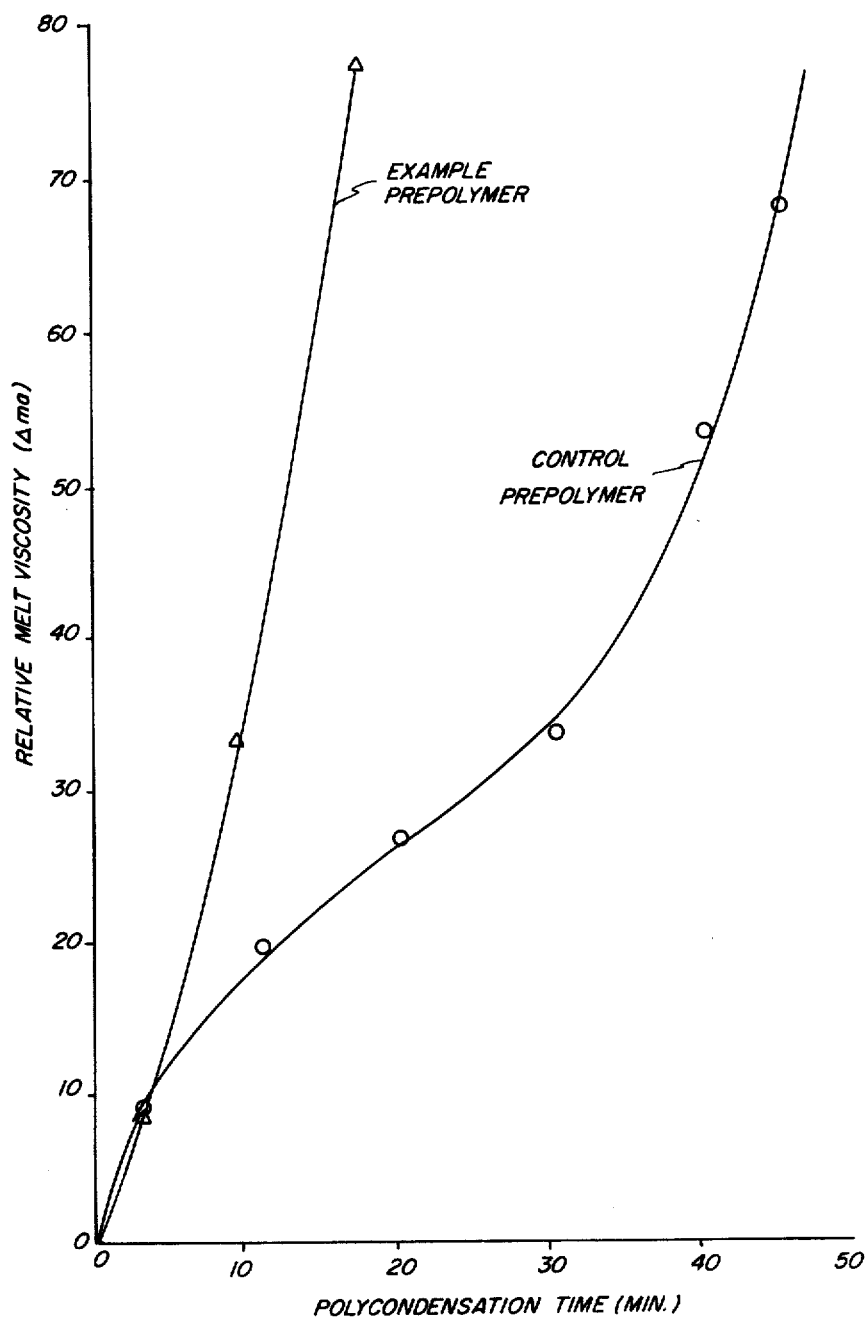
FIG. 1 is a graph plotting relative melt viscosity (which is correlated to the change in agitator torque) as a function of polycondensation time for both purified (Example) and nonpurified (Control) poly(ethylene terephthalate) prepolymers prepared as described in the Example hereinbelow.

In general, the practice of this invention comprises reacting together one or more dicarboxylic acids (also known as diacids) and one or more glycols (also known as diols) in what is generally termed a condensation or an ester interchange reaction. Such dicarboxylic acids and glycols are also commonly known as polymer precursors. Ester interchange reactions typically occur in the presence of one or more transesterification catalysts (examples listed hereinbelow) at a reaction temperature in the range of from about 125° to about 300° C., and preferably in a range of from about 180° to about 270° C. Reaction pressure is typically in the range of from about 0.1 mm Hg to about one or more atmospheres, and preferably in the range of from about 760 to about 1520 mm Hg. Ester interchange is generally continued for from about 30 to about 300 minutes or until the oligomers resulting from reaction have an inherent viscosity in the range of from about 0.05 to about 0.15. Unless otherwise stated herein, the inherent viscosities are determined in an organic solvent or mixtures thereof, such as phenol, chlorobenzene, tetrachloroethane, or a 60:40 (weight) mixture of phenol and chlorobenzene at 25° C. and a concentration of 0.25 grams polymer per deciliter of solution. Low molecular weight reaction by-products, such as water, lower alcohols (e.g. methanol and ethanol), glycols, acids and esters, can be removed during the reaction, if desired, by distillation or another standard technique. Generally, at least about 1.1, and preferably from about 1.3 to about 2, moles of glycol are present for each mole of dicarboxylic acid.

The described ester interchange reaction results in a reaction mixture containing the desired condensation oligomers each having an average degree of polymerization of about 4 or less, reaction by-products, as mentioned hereinabove residual polymer precursors and residual catalyst. This reaction mixture is then subjected to a purification step to remove substantially everything except the condensation oligomers. This purification may be accomplished in any suitable manner, with one or more individual operations. For example, low boiling materials may be removed by evaporation and high boiling materials by extraction with a solvent.

Preferably, the reaction mixture is purified by extracting the reaction by-products, the residual polymer precursors and the residual catalyst with a hot solvent, i.e. a solvent heated to a temperature in the range of from about 20° to about 100° C. and preferably from about 20° to about 70° C. This temperature will vary depending upon the particular prepolymer to be purified and compounds to be removed. As is known, "extraction" is the dissolution and removal of one or more constituents from a mixture with a solvent which dissolves these constituents but not others. Typical extraction solvents useful in the practice of this invention include water or aqueous solutions (see, for example, U.S. Pat. No. 4,289,874 issued Sept. 15, 1981to Bockrath), organic solvents, such as alcohols (e.g. methanol, ethanol, propanol, etc.), ketones (e.g. acetone, methylethyl ketone, etc.) chlorinated, hydrocarbons (e.g. methylene chloride, ethylenedichloride, etc.), hydrocarbons, carboxylic esters and esters, and mixtures of organic solvents or mixtures of one or more organic solvents with water or one or more aqueous solutions. Generally, any solvent can be used which will dissolve the compounds to be removed but not the oligomers. This purification by extraction is typically accomplished under ambient conditions.

In a preferred embodiment of this invention, the purification step is accomplished by extraction with water or an aqueous solution heated to a temperature in the range of from about 50° to about 70° C. As noted hereinabove, the temperature of the water or aqueous solution will vary depending upon the oligomers to be purified and the compounds to be removed. For example, for purifying a reaction mixture containing oligomers of poly(ethylene terephthalate), extraction is preferably carried out with hot water or hot methanol heated to about 55° C. Alternatively, extraction can be accomplished with an alcohol (e.g. methanol) heated to a temperature in the range of from about 20° to about 60° C. A series of extractions can be carried out, if desired.

The purification step described herein increases the crystallinity of the condensation oligomers produced by the ester interchange reaction. Typically, the crystallinity increases from essentially zero to about 100 percent, as determined by X-ray diffraction analysis. As is well known, when subjected to X-rays, a crystalline material exhibits a coherent scattering due to its crystalline order and has many sharp maximum peaks in its diffraction pattern. Amorphous materials exhibit incoherent X-ray scattering and have a broad band with few or no sharp peaks.

After the purification step, the condensation oligomers are subsequently polymerized to form the desired polyester. Preferably, this polymerization is carried out in two stages: polycondensation of substantially all of the condensation oligomers to form a prepolymer, typically in molten form; and polymerization of the prepolymer to form a polyester. Polycondensation is typically carried out at a temperature in the range of from about 120° to 300° C., and preferably from about 200° to about 300° C. The polycondensation pressure is from about 0.05 to about 50 mm Hg, and preferably from about 0.2 to about 5 mm Hg. One or more polycondensation catalysts can be used, if desired. Typical catalysts are listed hereinbelow. Because of the purification step preceding polycondensation, the condensation oligomers are more reactive. Hence, polycondensation is accomplished in a shorter time, thereby minimizing the likelihood of undesirable prepolymer degradation and resulting discoloration. In general, the time for polycondensation is in the range of from about 30 to about 180 minutes, and preferably from about 35 to about 50 minutes. Alternatively, the polycondensation time can be kept to a standard length and the polycondensation temperature lowered, again reducing the possibility of prepolymer degradation.

The resulting prepolymer typically has an inherent viscosity in the range of from about 0.3 to about 0.5, and preferably from about 0.35 to about 0.40 as measured in the organic solvents listed hereinabove. In the case of one preferred polyester prepolymer made by the process of this invention, poly(ethylene terephthalate), the inherent viscosity is typically in the range of from about 0.37 to about 0.40 as measured in a 60:40 (weight) mixture of phenol and chlorobenzene. Prepolymers prepared by the method of this invention can also be characterized by a melting point. Typically, such prepolymers have a melting point below about 250° C., and an average molecular weight in the range of from about 8,000 to about 10,000. The poly(ethylene terephthalate) prepolymer can also be characterized by a melting point of about 250° C. and a number average molecular weight in the range of from about 2500 to about 12,000.

The prepolymer can be further polymerized in any suitable manner. For example, it can be polymerized in a molten state using conditions and equipment known to a worker skilled in polymer chemistry. Preferably, however, it is solidified in order to prepare it for solid phase polymerization. Typically, solidification is accomplished by cooling the prepolymer. This can be done in any suitable way. For example, the molten prepolymer can be quenched in water. Alternatively, the molten prepolymer can be fanned with air at a temperature below the melting point and allowed to cool. Still again, the prepolymer can be cast onto a surface, such as a shallow stainless steel tray, and allowed to cool at room temperature. The particular details of a preferred solidification procedure are described in U.S. Pat. No. 3,342,782 (issued Sept. 19, 1967 to Barkey) the disclosure of which is incorporated herein by reference.

Once in solid form, the prepolymer can be pulverized or ground into particles having an average diameter along a major axis in the range of from about 0.08 to about 0.25 millimeters to form a powder. The temperature and shear energy applied during grinding is closely monitored so as to prevent undesirable discoloration. Pulverization can be accomplished in any suitable way with any suitable conventional milling equipment.

The prepolymer powder is subsequently subjected to what is described in the art as "solid phase" or "powder" polymerization. This polymerization is typically accomplished at a temperature of from about 5° to about 80° C. below the prepolymer melting point and in the range of from about 175° to about 300° C. in the presence of an inert gas at about atmospheric pressure. However, any suitable polymerization conditions and equipment can be used, the details of which are well known in the art, e.g. as described in U.S. Pat. No. 3,075,952 (issued Jan. 29, 1963 to Coover, Jr. et al.) the disclosure of which is incorporated hereby by reference.

The polymer precursors mixed together and reacted to form condensation oligomers in the practice of this invention include dicarboxylic acids and glycols. As used throughout this specification and in the claims, the terms "dicarboxylic acid" and "glycol" can refer to a mixture of acids and a mixture of glycols, respectively, and, unless the context requires otherwise, are intended to include functional equivalents.

Dicarboxylic acids useful in the practice of this invention are typically dicarboxylic acids or functional derivatives thereof, such as esters, acid halides or anhydrides, which are capable of condensing with glycols or their functional derivatives to form condensation oligomers. These dicarboxylic acids can be represented, for example, by the formula

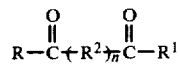

wherein n is 0 or 1; and each of R and R$^1$ is hydroxy, halogen (e.g. fluoro, chloro, bromo or iodo), or alkoxy, preferably of from 1 to 12 carbon atoms, (e.g methoxy, ethoxy, t-butoxy, chloromethoxy etc.) or R and R$^1$ taken together form an oxy linkage. Preferably, n is 1 and each of R and R$^1$ is hydroxy or alkoxy of from 1 to 4 carbon atoms. More preferably, each of R and R$^1$ is alkoxy of 1 to 2 carbon atoms. Most preferably, each is methoxy.

R$^2$ is a divalent aliphatic, alicyclic or aromatic radical, preferably of from 1 to 40 carbon atoms and including carbon and hydrogen atoms, and optionally, oxygen, sulfur or nitrogen atoms. Typical aliphatic, alicyclic and aromatic radicals include alkylene (e.g. methylene, ethylene, iso-propylene, hexylene, 1,3-dimethyloctylene, dodecylene, etc.); cycloalkylene (e.g. cyclopentylene, cyclohexylene, heptylene, 2,4-dimethyl-1,3-cyclohexylene, bicyclo[2.2.1] heptylene, etc.); alkylidene (e.g. ethylidene, 2-propylidene, 4-hexylidene, 3-ethyl-4-heptylidene, etc.); arylene (e.g. phenylene, naphthylene, 3-methyl-1,4-phenylene, anthrylene, etc.); alkylnylene (e.g. 2-butynylene, 1-methyl-3-pentnylene, 3-hexynylene, etc.); alkylenearylene (e.g. methylenephenylene, 4-butoxylene-2-ethyl-phenylene, 2-ethylene-1-methyl-3,6-naphthylene, etc.); alkylenecycloalkylene (e.g. methylene-1,4-cyclohexylene, ethylene-1,3-cyclopentylene, 2-hexylene-1,4-cycloheptylene, etc.); alkylenebisarylene (e.g. diphenylenemethylene, diphenylene-1,4-pentylene, etc.); cycloalkylenebisalkylene (e.g. dimethylene-1,3-cyclopentylene, dimethylene-1,4-cyclohexylene, diisopropylene-1,4-cyclohexylene, etc.); arylenebisalkylene (e.g. dimethylene-1,4- phenylene, di-1,5-pentylene-1,3-phenylene, etc.); alkylene-oxy-alkylene (e.g. ethylene-oxy-ethylene, methylene-oxy-propylene, ethylene-oxy-ethylene-oxy-ethylene, etc.); alkylene-oxy-arylene-oxy-alkylene (e.g. ethylene-oxy-1,4-phenylene-oxy-ethylene, etc.), and other similar substituted or unsubstituted divalent radicals. $R^2$ can also be a divalent radical obtained from a polymeric acid having up to 40 carbon atoms. Preferably, $R^2$ is a divalent hydrocarbon of 1 to 18 carbon atoms, such as alkylene, cycloalkylene or arylene. More preferably, $R^2$ is a arylene, such as phenylene unsubstituted or substituted with lower alkyl of 1 to 4 carbon atoms, halo or other inert substituents.

Representative dicarboxylic acids useful in the practice of this invention include sebacic acid, 1,4-cyclohexanedicarboxylic acid, adipic acid, glutaric acid, succinic acid, carbonic acid, oxalic acid, azelaic acid, 4-cyclohexene-1,3-dicarboxylic acid, 2-ethylsuberic acid, 2,2,3,3-tetramethylsuccinic acid, 4,4'-bicyclohexyldicarboxylic acid, terephthalic acid, isophthalic acid, dibenzoic acid, bis(p-carboxylphenyl)methane, 1,5-naphthalenedicarboxylic acid, phenanthrene dicarboxylic acid, 4,4'-sulfonyldibenzoic acid, iminodisulfonylbenzoic acid (or acid salt) and other similar acids known in the art, including those disclosed, for example, in U.S. Pat. Nos. 2,901,466 (issued Aug. 25, 1959 to Kibler et al.); 3,546,180 (issued Dec. 8, 1970 to Caldwell); 3,929,489 (issued Dec. 30, 1975 Arcesi et al.) and 4,101,326 (issued July 18, 1978 to Barkey). Alkyl ester, acid halide and anhydride derivatives of these acids are also useful in the practice of this invention.

Glycols useful in the practice of this invention are typically dihydric alcohols or functional derivatives thereof, such as esters, which are capable of condensing with dicarboxylic acids or their functional derivatives to form condensation oligomers. Such glycols can be represented, for example, by the formula $R^3O-R^5-OR^4$ wherein each of $R^3$ and $R^4$ is hydrogen or alkylcarbonyl, preferably of from 2 to 7 carbon atoms, and $R^5$ is a divalent aliphatic, alicyclic or aromatic radical, preferably of from 2 to 40 carbon atoms. An alkylcarbonyl can be represented by the formula

$$R^6-\overset{O}{\underset{\|}{C}}-$$

wherein $R^6$ is alkyl, preferably of from 1 to 6 carbon atoms (e.g. methyl, propyl, t-butyl, 2-methylpentyl, chloromethyl, etc.) Representative alkylcarbonyl radicals include acetyl, propionyl, butyryl, etc. Preferably, each of $R^3$ and $R^4$ is hydrogen.

$R^5$ is a divalent aliphatic, alicyclic or aromatic radical, preferably of from 2 to 40 carbon atoms and including carbon and hydrogen atoms, and optionally, oxygen, sulfur or nitrogen atoms. Typical aliphatic, alicyclic and aromatic radicals include alkylene, cycloalkylene, alkylidene, arylene, alkylnylene, alkylenearylene, alkylenecycloalkylene, alkylenebisarylene, cycloalkylenebisalkylene, arylenebisalkylene, alkylene-oxy-alkylene, alkylene-oxy-arylene-oxy-alkylene and other similar substituted and unsubstituted divalent radicals as defined hereinabove for $R^2$ except that $R^5$ must have at least two carbon atoms. $R^5$ can also be a divalent radical obtained from a polymeric glycol having up to 40 carbon atoms. Preferably, $R^5$ is a divalent hydrocarbon of 1 to 18 carbon atoms, such as aklylene, cycloalkylene or arylene as described for $R^2$. More preferably, $R^5$ is alkylene, such as ethylene, isopropylene, 1,1-dichloroethylene, neopentylene, hexylene, etc.

Representative glycols useful in the practice of this invention include ethylene glycol, diethylene glycol, triethylene glycol, 1,3-propanediol, 2-methyl-1,5-pentanediol, neopentyl glycol, 1,4-bis($\beta$-hydroxyethoxy)-cyclohexane, 1,4-cyclohexanediol, norcamphanediols, 2,2,4,4-tetraalkylcyclobutane-1,3-diols, p-xylene glycol, 1,4-bis($\beta$-hydroxypropoxy)benzene, poly(ethylene glycol), poly(tetramethylene glycol), hydroxyl terminated polyesters of aliphatic diacids and glycols, and corresponding alkyl esters thereof.

Small amounts of what are known in the art as polyfunctional modifiers (also known as branching agents) can be used in the practice of this invention. These modifiers contain three or more functional radicals, such as hydroxyl or carboxyl radicals or functional derivatives thereof, such as esters and anhydrides. Representative modifiers include polyols having three or more hydroxy radicals, polycarboxylic acids having three or more carboxyl radicals and hydroxy acids having three or more hydroxyl and carboxyl radicals, or functional equivalents of such radicals (e.g. esters, acid halides, anhydrides). Examples of useful modifiers are trimesic acid, trimellitic anhydride, butanetetracarboxylic acid, glycerol, pentaerythritol, 5-(2-hdroxyethoxy)isophthalic acid and others as described, for example, in U.S. Pat. No. 4,217,440 (issued Aug. 12, 1980 to Barkey).

Ester interchange (or transesterification) and polycondensation catalysts useful in the practice of this invention include a single catalyst or mixtures of catalysts such as those described in U.S. Pat. Nos. 3,075,952 (mentioned hereinabove); 3,806,468 (issued Apr. 23, 1974 to Barkey) and 3,830,759 (issued Aug. 10, 1974 to Barkey). Such catalysts are generally available in the form of organic or inorganic metal compounds, e.g. tetraisopropyl titanate, titanium dioxide, zinc acetate, zinc acetyl acetonate, calcium oxide, manganese oxide, antimonous oxide and the like. One or more catalysts are typically present during ester interchange in a concentration of from about 0.03 to about 0.1 weight percent, based on total weight of polymer precursors. Similarly, one or more catalysts are typically present in a concentration of from about 0.006 about 0.03 weight percent, based on total weight of polymer precursors during the polycondensation step of the process of this invention. It is well within the skill of an ordinary worker in polymer chemistry to choose appropriate catalyst(s) for the individual steps of prepolymer preparation. The acetates, chlorides, nitrates, sulfates, oxides and alkoxides of metals such as zinc, manganese, tin, titanium, antimony, cobalt and lithium are preferred. Buffering compounds, such as alkaline salts of organic acids, can be included with the catalysts if desired.

Examples of polyesters which can be prepared by the process of this invention include poly(ethylene terephthalate), poly(ethylene 2,6-naphthalate), poly(tetramethylene 1,2-ethane-p-dioxybenzoate), poly(1,4-cyclohexanedimethylene terephthalate), poly(neopentylene adipate), poly(ethylene terephthalate-co-succinate), co-poly(1,4-cyclohexanedimethylene terephthalate and oxydiethylene isophthalate) and others well within the skill of an ordinary worker in the polymer chemistry art.

The polyesters prepared from the prepolymers prepared by the process of this invention can also contain various stabilizers, antioxidants, fillers, pigments, ultraviolet radiation absorbers, plasticizers and other addenda known to be useful in polyesters. These polyesters are useful in a variety of products including, for example, photographic film supports, bottles, molded articles, fibers, adhesives, electrophotographic toners, lacquers, film substrates, etc.

The process of this invention is further illustrated by the following example of its practice.

EXAMPLE

This is a comparative example illustrating the improved reactivity exhibited by a prepolymer prepared by the process of this invention having the described purification step compared to a prepolymer prepared by a prior art process lacking a purification step.

A poly(ethylene terephthalate) prepolymer was prepared in the following manner according to the process of this invention:

The following components were subjected to ester interchange reaction at a pressure of about 760 mm Hg and a temperature which increased from about 152° to about 216° C. over the reaction time of about 115 minutes:

| Dimethyl terephthalate | 5.0 kg | (25.7 moles) |
| Ethylene glycol | 28.0 kg | (45.1 moles) |
| Zinc acetate catalyst | 10.8 g | |
| Antimonous oxide catalyst | 17.8 g | |

The resulting reaction mixture was then crystallized and purified by extracting residual ethylene glycol and terephthalic acid and undesired by-products diethylene glycol and aldehydes from the reaction mixture with hot methanol (heated to about 60° C.). Residual catalyst was removed by dispersing the reaction mixture in hot water or hot methanol at 55° C. for 5 minutes and thereafter filtering the mixture. The resulting condensation oligomer was more crystalline than before purification and had an inherent viscosity of about 0.08.

The condensation oligomer was then polycondensed in a stainless steel reactor with the polycondensation temperature increased from about 178° to about 275° C. over a polycondensation time of about 98 minutes. Polycondensation pressure was about 1 mm Hg.

A Control poly(ethylene terephthalate) prepolymer was prepared in a similar manner except that the purification step after ester interchange was omitted.

The inherent viscosities of the Control prepolymer and the Example prepolymer prepared according to the process of this invention were 0.4 and 0.46, respectively, as measured in a 60:40 (weight) mixture of phenol and chlorobenzene. The Control prepolymer was noticeably more discolored (yellowed) than the Example prepolymer.

FIG. 1 is a graph depicting the change in relative melt viscosity with polycondensation time for both prepolymers during the polycondensation step. The speed of polyester molecular weight build-up during polycondensation is typically correlated to an increase in polymer melt viscosity, which in turn is typically correlated to the increase in torque in the reactor vessel agitator. The increased torque is relatively expressed by the change in electrical current (Δma or change in milliamperes) of the agitator motor. For example, an increase in torque of about 70 Δma correlated to an inherent viscosity increase of about 0.4 in this example. From FIG. 1 it is evident that the Example condensation oligomer, prepared by this invention, was considerably more reactive than the Control condensation oligomer because the inherent viscosity build-up of the resulting Example prepolymer was much more rapid than that for the resulting Control prepolymer. This improved reactivity is the result of the purification of the Example oligomers by extraction.

Figure 2:
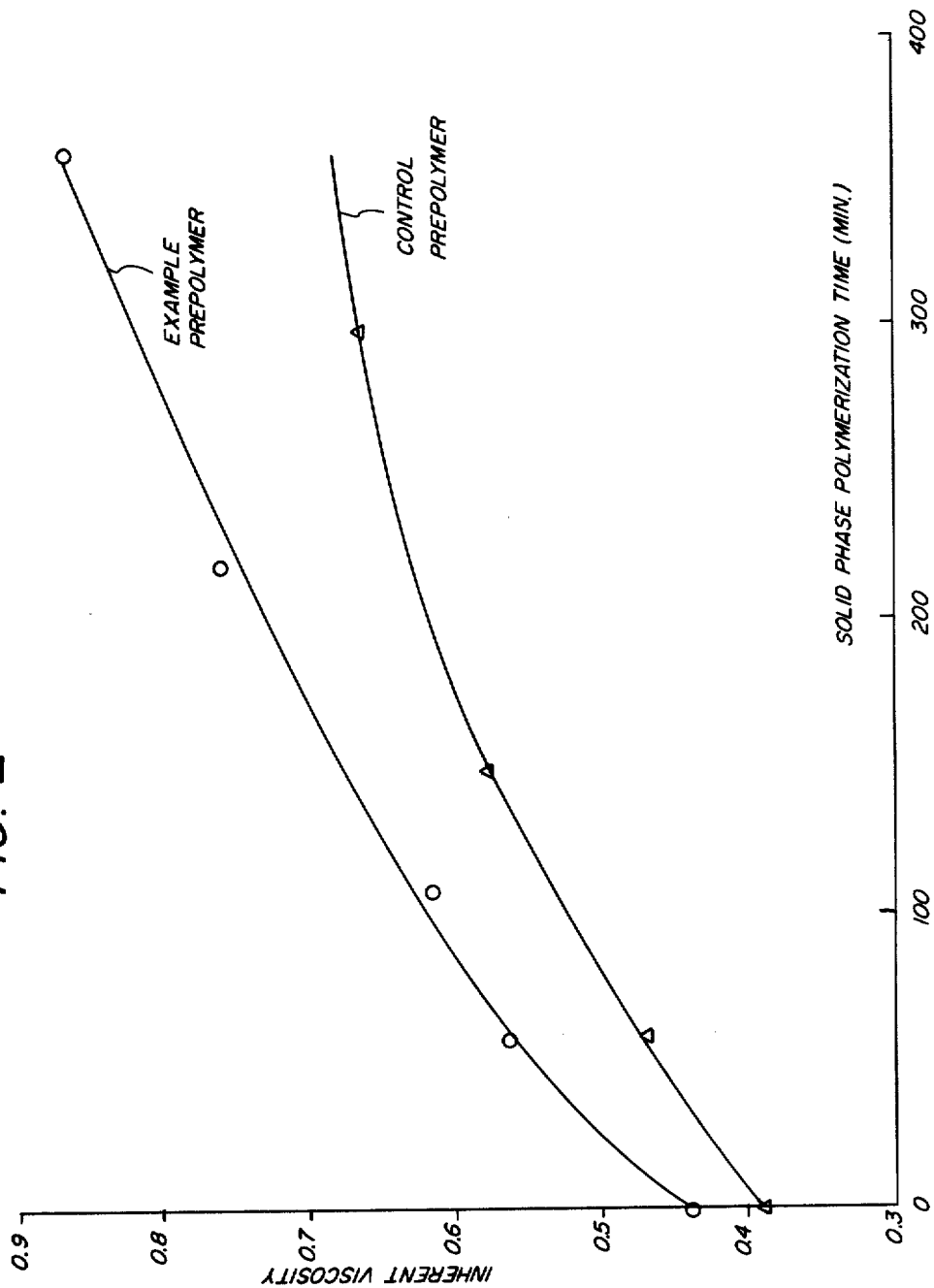
FIG. 2 is a graph plotting inherent viscosity as a function of solid phase polymerization time for both purified (Example) and nonpurified (Control) poly(ethylene terephthalate) prepolymers prepared as described in the Example hereinbelow.

Samples of both prepolymers were subsequently solidified and ground into a powder of fine particles and subjected to solid phase polymerization at 210° C. for 6 hours in a conventional heated hot block. The results of the build-up of inherent viscosity with solid phase polymerization time are illustrated in FIG. 2. It is apparent from these results that the Example prepolymer exhibited a higher reactivity (i.e. faster molecular weight build-up) than the Control prepolymer.

This invention has been described in detail with particular reference to preferred embodiments thereof, but it will be understood that variations and modifications can be effected within the spirit and scope of the invention.

I claim:

1. In a method for preparing a prepolymer composed of constituents of a dicarboxylic acid and a glycol, which method comprises:
   (a) reacting said dicarboxylic acid and said glycol in the presence of a transesterification catalyst at a reaction temperature and pressure effective to form a reaction mixture containing condensation oligomers, reaction by-products and residual dicarboxylic acid, glycol and catalyst; and
   (b) subjecting said reaction mixture to a temperature and pressure effective to polycondense substantially all of said oligomers to form a molten prepolymer,
   the improvement which comprises purifying said reaction mixture prior to said polycondensation step (b) to remove substantially all of said reaction by-products and said residual dicarboxylic acid, glycol and catalyst and to crystallize said condensation oligomers, whereby said prepolymer has increased reactivity when subjected to polymerization.

2. The method of claim 1 wherein said purification step is accomplished by extraction with a solvent heated to a temperature in the range of from about 20° to about 100° C.

3. The method of claim 1 wherein said purification step is accomplished by an extraction with hot water or hot alcohol.

4. The method of claim 1 comprising the additional steps of solidifying said molten prepolymer and pulverizing said solidified prepolymer.

5. The method of claim 1 wherein said dicarboxylic acid is represented by the formula

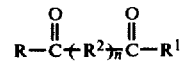

wherein n is 0 or 1, each of R and R¹ is hydroxy, halogen or alkoxy, or R and R¹ taken together form an oxy linkage; and R² is a divalent aliphatic, alicyclic or aromatic radical.

6. The method of claim 5 wherein n is 1; each of R and R¹ is hydroxy or alkoxy of from 1 to 12 carbon atoms; and R² is alkylene, cycloalkylene or arylene of from 1 to 18 carbon atoms.

7. The method of claim 6 wherein R² is phenylene.

8. The method of claim 1 wherein said glycol is represented by the formula R³O—R⁵—OR⁴ wherein each of R³ and R⁴ is hydrogen or alkylcarbonyl; and R⁵ is a divalent aliphatic, alicyclic or aromatic radical.

9. The method of claim 8 wherein each of R³ and R⁴ is hydrogen and R⁵ is alkylene, cycloalkylene or arylene of from 1 to 18 carbon atoms.

10. The method of claim 9 wherein R⁵ is alkylene.

11. The method of claim 1 wherein said prepolymer has an inherent viscosity in the range of from about 0.3 to about 0.5 as measured at 25° C. in a 60:40 (weight) mixture of phenol and chlorobenzene.

12. In a method for preparing a prepolymer composed of constitutents of a dicarboxylic acid represented by the formula

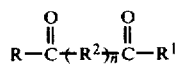

wherein n is 0 or 1, each of R and R¹ is hydroxy or alkoxy of from 1 to 12 carbon atoms, and R² is alkylene, cycloalkylene or arylene of from 1 to 18 carbon atoms; and at least one glycol represented by the formula HO—R⁵—OH wherein R⁵ is alkylene, cycloalkylene or arylene of from 1 to 18 carbon atoms, which method comprises:
  (a) reacting said dicarboxylic acid and said glycol in the presence of a transesterification catalyst at a temperature in the range of from about 180° to about 220° C. and a pressure in the range of from about 760 to about 1520 mm Hg to form a reaction mixture containing condensation oligomers, reaction by-products and residual dicarboxylic acid, glycol and catalyst; and
  (b) subjecting said reaction mixture to a temperature in the range of from about 209° to about 300° C. and a pressure in the range of from about 0.2 to about 5 mm Hg to polycondense substantially all of said oligomers to form a molten prepolymer,
the improvement which comprises purifying said reaction mixture prior to said polycondensation step (b) by extracting substantially all of said reaction by-products and said residual dicarboxylic acid, glycol and catalyst with a solvent heated to a temperature in the range of from about 20° to about 70° C., thereby crystallizing said condensation oligomers, whereby said prepolymer has increased reactivity when subjected to polymerization.

13. The method of claim 12 wherein said prepolymer is poly(ethylene terephthalate).

14. The method of claim 12 comprising the additional steps of solidifying said molten prepolymer and pulverizing said solidified prepolymer.

15. In a method for preparing a polyester composed of constitutents of a dicarboxylic acid and a glycol, which process comprises:
  (a) reacting said dicarboxylic acid and said glycol in the presence of a transesterification catalyst at a reaction temperature and pressure effective to form a reaction mixture containing condensation oligomers, reaction by-products and residual dicarboxylic acid, glycol and catalyst; and
  (b) subjecting said reaction mixture to a temperature and pressure effective to polymerize substantially all of said oligomers to form a polyester,
the improvement which comprises purifying said reaction mixture immediately after said reaction step (a) to remove substantially all of said reaction by-products and said residual dicarboxylic acid, glycol and catalyst and to crystallize said condensation oligomers.

16. The method of claim 15 wherein polymerization step (b) comprises the stages: (c) polycondensing substantially all of said oligomers to form a prepolymer; and (d) polymerizing said prepolymer to form said polyester.

17. The method of claim 16 wherein said prepolymer is solidified and pulverized prior to said polymerization step (d).

18. The method of claim 15 wherein said purification step is accomplished by extraction with a solvent heated to a temperature in the range of from about 20° to about 70° C.

19. The method of claim 15 wherein said dicarboxylic acid is represented by the formula

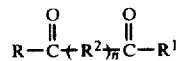

wherein n is 0 or 1, each of R and R¹ is hydroxy, halogen or alkoxy, or R and R¹ taken together form an oxy linkage, and R² is a divalent aliphatic, alicyclic or aromatic radical; and said glycol is represented by the formula R³—R⁵—OR⁴ wherein each of R³ and R⁴ is hydrogen or alkylcarbonyl, and R⁵ is a divalent aliphatic, alicyclic or aromatic radical.

* * * * *